(12) United States Patent
Wunderlich

(10) Patent No.: US 7,464,202 B2
(45) Date of Patent: Dec. 9, 2008

(54) CLOCK SYSTEM FOR CONTROLLING AUTONOMOUS TRANSFER OF DATA

(75) Inventor: Chris Wunderlich, Canton, MI (US)

(73) Assignee: Infineon Technologies AG, Munich (DE)

( * ) Notice: Subject to any disclaimer, the term of this patent is extended or adjusted under 35 U.S.C. 154(b) by 249 days.

(21) Appl. No.: 11/364,059

(22) Filed: Feb. 28, 2006

(65) Prior Publication Data
US 2007/0213845 A1    Sep. 13, 2007

(51) Int. Cl.
    *G06F 1/06*    (2006.01)
(52) U.S. Cl. .......................... 710/60; 713/322
(58) Field of Classification Search ............. 710/58, 710/60; 713/322, 600
    See application file for complete search history.

(56) References Cited

U.S. PATENT DOCUMENTS

| | | | | |
|---|---|---|---|---|
| 5,261,081 A | * | 11/1993 | White et al. ................ | 713/600 |
| 5,319,789 A | * | 6/1994 | Ehlig et al. ................. | 712/228 |
| 5,719,515 A | * | 2/1998 | Danger ...................... | 327/270 |
| 5,926,053 A | * | 7/1999 | McDermott et al. ......... | 327/298 |
| 6,356,122 B2 | * | 3/2002 | Sevalia et al. ............... | 327/105 |
| 2007/0033427 A1 | * | 2/2007 | Correale et al. ............ | 713/500 |

OTHER PUBLICATIONS

Office Action issued Jan. 2, 2008 in U.S. Appl. No. 11/364,041.

* cited by examiner

Primary Examiner—Eddie P Chan
Assistant Examiner—Hyun Nam
(74) Attorney, Agent, or Firm—Eschweiler & Associates, LLC

(57) ABSTRACT

A system that controls the application of a clock signal used to autonomously transfer data from a remote device to a host device. The clock signal can be allowed to continually cycle for legacy applications, or can be controlled to only cycle when data transmissions are occurring.

20 Claims, 5 Drawing Sheets

CLOCK SYSTEM FOR CONTROLLING AUTONOMOUS TRANSFER OF DATA

FIELD OF INVENTION

The present invention relates generally to communications systems and more particularly to a clock that can be selectively activated.

BACKGROUND OF THE INVENTION

It can be appreciated that the acquisition, transfer and use of digital data is on the rise. In automotive applications, for example, more and more operating conditions of the vehicle, as well as characteristics of occupants within the vehicle are being monitored on a continual or intermittent basis. For example, respective pressures within the carburetor and/or engine may be monitored as well as the weight and/or position of one or more occupants of the vehicle. Similarly, the temperature at one or more locations within the vehicle as well as the pressure and/or rotational speed of one or more tires on the vehicle may be monitored, among other things, by multiple sensors in the vehicle.

It can also be appreciated that the value and/or usefulness of such data is dependent upon the data's freshness and/or how quickly a processor and/or other type of data management component can access the data. For example, when the operator of a vehicle jams on the brakes to avoid a rear end collision, wheel speed and/or power train data may need to be available as quickly as possible to control an antiskid mechanism. The weight and/or location of a passenger may also need to be known to control airbag deployment, for example. Likewise, an engine pressure and/or fuel mixture may need to be known when the operator presses on the accelerator to pass another vehicle so that the vehicle's speed can be quickly but safely increased by adjusting the fuel mixture and/or flow rate, for example.

Accordingly, a technique that facilitates quick and efficient data transfers, particularly in automotive applications, to a component that can make use of that data would be desirable.

With various type of application, for example, automotive type applications, the proliferation of many, constantly changing clock signals can undesirably cause EMI issues and increase power consumption. Consequently, a technique to address such issues would be desirably as well.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, its primary purpose is merely to present one or more concepts of the invention in a simplified form as a prelude to the more detailed description that is presented later.

A system is disclosed that controls the application of a clock signal used to autonomously transfer data from a remote device to a host device. The clock signal can be allowed to continually cycle for legacy applications, or can be controlled to only cycle when data transmissions are occurring.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

DETAILED DESCRIPTION OF THE INVENTION

Figure 1:
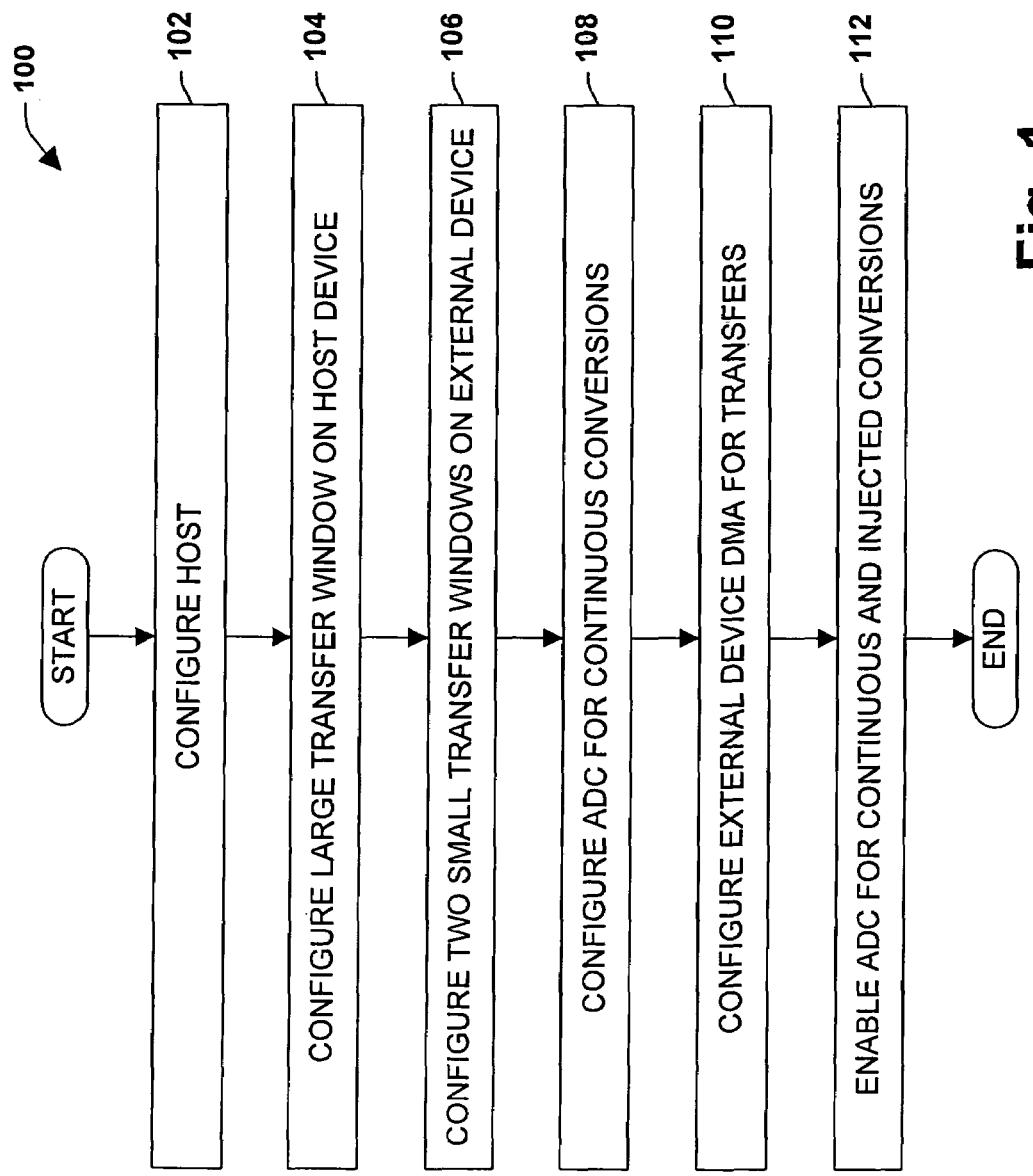
FIG. 1 is a flow diagram illustrating an exemplary methodology for efficiently transferring data from a remote device to a host device using a multilink (MLI) according to one or more aspects and/or embodiments of the present invention.

One or more aspects and/or embodiments of the present invention are described with reference to the drawings, wherein like reference numerals are generally utilized to refer to like elements throughout, and wherein the various structures are not necessarily drawn to scale. It will be appreciated that where like acts, events, elements, layers, structures, etc. are reproduced, subsequent (redundant) discussions of the same may be omitted for the sake of brevity. In the following description, for purposes of explanation, numerous specific details are set forth in order to provide a thorough understanding of one or more aspects and/or embodiments of the present invention. It may be evident, however, to one of ordinary skill in the art that one or more aspects and/or embodiments of the present invention may be practiced with a lesser degree of these specific details. In other instances, known structures are shown in diagrammatic form in order to facilitate describing one or more aspects and/or embodiments of the present invention.

FIG. 1 illustrates an exemplary methodology 100 for efficiently transferring data from a remote device to a host device using a multilink (MLI) according to one or more aspects and/or embodiments of the present invention. While the method 100 is illustrated and described as a series of acts or events, it will be appreciated that such acts or events are not intended to be limiting. For example, some acts may occur in different orders and/or concurrently with other acts or events apart from those illustrated and/or described herein. In addition, not all illustrated steps may be required to implement a methodology in accordance with one or more aspects or embodiments of the present invention. Further, one or more of the acts depicted herein may be carried out in one or more separate acts and/or phases. It will also be appreciated that reference is made herein to FIG. 2 in describing the method illustrated in FIG. 1, where FIG. 2 illustrates a communications control system 200 that includes a host device 202 and a remote device 204 and how data communications are facilitated there-between with a multilink (MLI) 206 according to one or more aspects and/or embodiments of the present invention.

The method 100 begins at 102 wherein the host device 202 is configured. In particular, the host 202 is powered up, started or otherwise initiated. In one embodiment, the data communications discussed herein occur within the context of a motor vehicle, and this may correspond to turning the ignition key and/or starting the vehicle. In the illustrated embodiment, configuring the host 202 at 102 may also comprise configuring an aspect of the multilink (MLI) 206 operatively associated with the host 202 to receive data from the remote device 204. In one embodiment, the MLI 206 comprises a hard wired 8 pin connection, for example, with 4 pins used for transmitting data and 4 pins used for receiving data. In the illustrated embodiment, the MLI 206 can be said to sit in both the host 202 and external 204 devices and be facing at a communications bus (not shown). The MLI 206 is thus diagrammatically illustrated in phantom in FIG. 2 as partially residing in both the host 202 and remote 204 devices, as well as being illustrated as a component 208 of the remote device 204.

Figure 2:
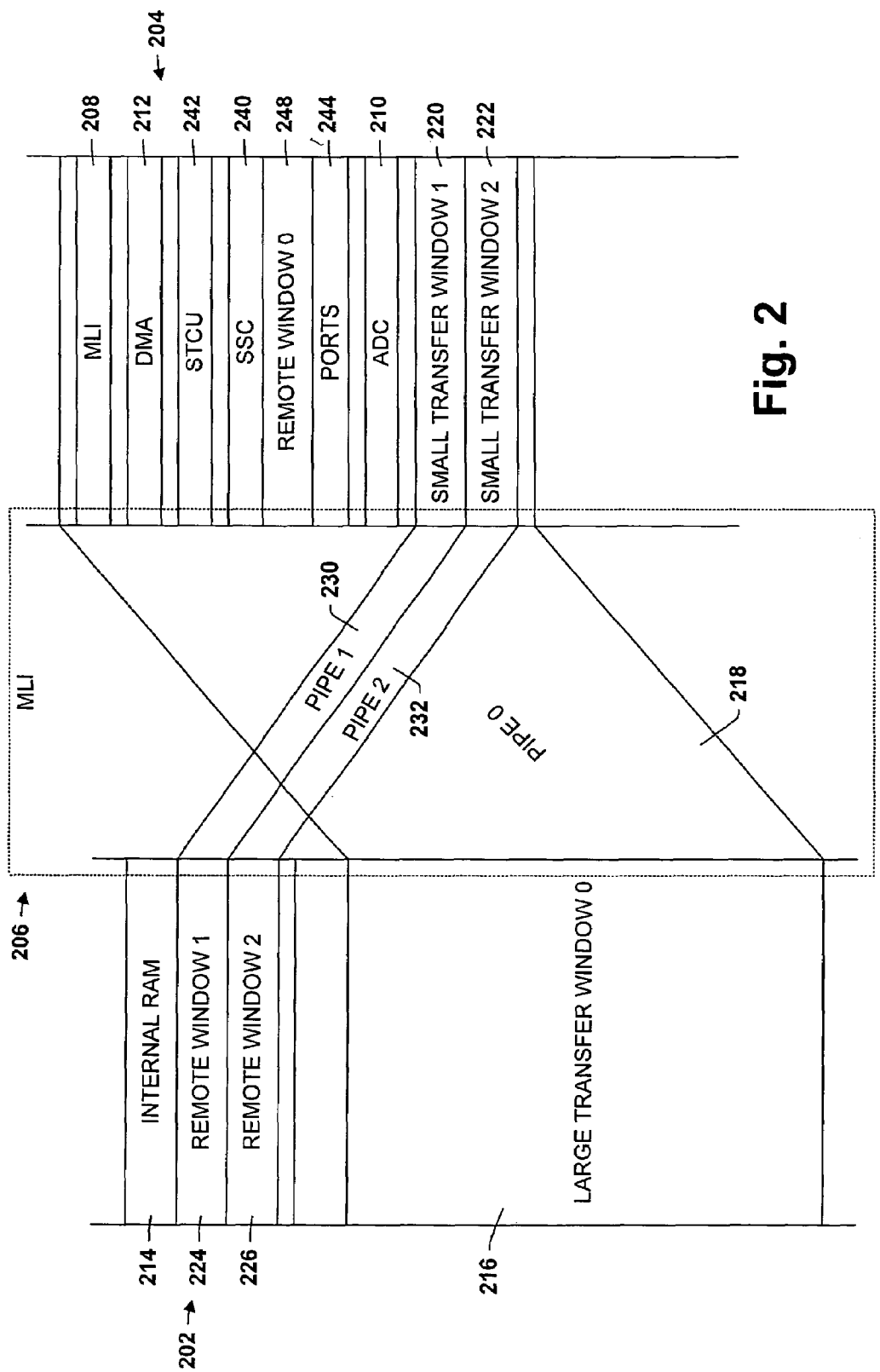
FIG. 2 is a diagram illustrating a host device and a local device and how data communications are facilitated therebetween with a multilink (MLI) according to one or more aspects and/or embodiments of the present invention.

In one embodiment, the host device 202 illustrated in FIG. 2 corresponds to a controller, processor and/or other type of data management component that may be centrally located within the vehicle. The host 202 may, for example, reside within the dashboard of the vehicle and may be responsible for controlling functions of the vehicle, such as airbag deployment, temperature regulation, fuel flow regulation, etc., in response to readings taken by sensors located throughout the vehicle. The remote device 204 is a device that is external to or peripheral to the host device 202. The remote device 204 may be located anywhere within the vehicle, such as in the dashboard as well, for example. In this embodiment, the remote device 204 is, however, operatively coupled to one or more of the sensors located throughout the vehicle. The remote device 204 is thus configured to receive signals from these sensors and to manipulate these signals in some fashion, such as by performing an analog to digital conversion on the signals, for example, with an analog to digital component (ADC) 210. In the illustrated embodiment, unlike the local or host device 202, however, the remote device 204 generally does not comprise a central processing unit (CPU), and includes direct memory access (DMA) registers 212 that facilitate transferring data to the host device 202. Transferring data as described herein facilitates efficient data transfers as the remote device 204 is configured to act as a host and automatically send data to Random Access Memory (RAM) 214 of the host device 202. The peripheral device 204 thus becomes somewhat intelligent giving the host device 202 single cycle access (through RAM 214) to fresh data. Thus, from an operational perspective, the remote device 204 appears to reside on the same chip as the host device 202.

After the host 202 and MLI therein are configured, the method advances to 104 where a large transfer window 216 on the host device 202 is configured. In the illustrated example, this window 216 is labeled as window 0, and is operatively coupled to the remote device 204 via pipe 0 218 which represents the media through which communications occur. Pipe 0 overlays all of the remote device 204 in the illustrated example so that any and all portions of the remote device 204 can be acted upon by the host device 202. It will be appreciated that since in this embodiment the remote device 204 requires no controller, CPU or nonvolatile memory, the large transfer window 216 and pipe 0 218 are configured and established in method 100 so that the remote device 204 can be configured when the remote device 204 is powered up.

The method then proceeds to 106 where first and second small transfer windows 220, 222 are configured in the remote device 204. In this embodiment, the windows are configured by the host device 202 via the large transfer window 216 and pipe 0 218. The small transfer windows 220, 222 are operatively coupled to the host device 202, and more particularly to first and second remote windows 224, 226 in RAM 214 of the host device 202. The small transfer windows 220, 222 are operatively coupled to the first and second remote windows 224, 226 by first and second communication pipes 230, 232. The first and second pipes 230, 232 represent the medium through which data is communicated from the remote device 204 to the host device 202. These pipes 230, 232 are controlled by the remote device 204, and as such the remote device 204 acts as a host or master over data transmissions from the remote device 204 to the host device 202.

As mentioned above, in the illustrated embodiment, the remote device 204 is operatively coupled to sensors located throughout a motor vehicle. The remote device 204 may, for example, be coupled to 16 sensors through 16 different channels. As such, the remote device 204 may receive signals from 16 different sensors, such as temperature sensors, pressure sensors, wheel speed sensors, etc. In the illustrated example, the remote device 204 performs an analog to digital conversion (ADC) on the signals. Accordingly, the ADC component 210 of the remote device 204 is configured at 108 in method 100 to continually convert analog signals to digital values. It will be appreciated that this configuration is effected by the host device 202, and more particularly via large transfer window 216 and pipe 0 218. Once configured in this manner, the remote device 204 thus no longer needs to be instructed by the host device 202 to perform an analog to digital conversion. The remote device 204 may, for example, iteratively cycle through the 16 different channels to read and digitize signals from the 16 different channels.

At 110, the remote device 204 is configured (again by the large transfer window 216 and pipe 0 218 of the host device 202) to have the DMA 212 automatically transfer data back to the host device 202. In this embodiment, the data is sent from the first 220 and second 222 small transfer windows of the remote device 204 along the first 230 and second 232 pipes, respectively, to the first 224 and second 226 remote windows of the host device 202. The remote device 204 is essentially configured to act as a state machine through the use of the DMA 212. The data also has an address associated with it that corresponds to the channel/sensor from which the data was generated. The MLI of the remote device 204 uses address information that is written into the transfer window 220 or 222 and sends that address along with the data in the transfer pipe 230 or 232. When the MLI in the external device sees addressed data, it takes the parallel data from the external device 204, puts it in serial form and sends it to the MLI of the host 202. The MLI of the host device 202 then re-parallelizes the serialized data and uses the associated address to put the data in the appropriate location in the host's ram.

It will be appreciated that in various embodiments the remote device 204 can transmit both time based data and event based data. Event based data corresponds to data that is injected into the RAM 214 of the host in response to a control signal from the host 202 or upon the occurrence of a triggering event as designated by the host device 202. Essentially, the host device puts out a "call" for information and receives the event based data in response thereto. Time based data, on the other hand, corresponds to data that is automatically and systematically delivered back to the host device 202 after initially configuring the remote device 204 as described herein. In the illustrated embodiments, the external device 204 has input triggers that can be associated with a DMA channel that is preprogrammed to write an ADC injection request to the ADC peripheral. Upon receiving this request the ADC will then perform an "injected ADC conversion". The injection refers to temporarily suspending the time based data and performing a conversion on a preconfigured channel. The ADC writes the result to a different register which in turn triggers another channel of the DMA to move the data to the second transfer window 222. Once the injected channel has been completed the time based conversions will resume. It will be appreciated that one type of data can be communicated in the first transfer window 220, first pipe 230 and first remote window 224, and that a second type of data can be communicated in the second transfer window 222, second pipe 232 and second remote window 226. For example, 220, 230 and 224 can be used for the routinely converted time based data, while 222, 232 and 226 can be used to transfer the event based data. Configuring the remote device 204 to act as a state machine facilitates the normal conversion transfers and injected conversion transfers. Where the remote device 204 is coupled to 16 sensors through 16 channels, for example, 16 bits of time based data would be transferred through the first pipe 230 and 16 bits of event based data would be transferred through the second pipe 232. In various embodiments, 16 bit packets generally comprise up to 12-bits of digitized data and 4-bits of address information, such as the channel number. An actual transfer (one transaction) between the host 202 and remote 204 devices, however, can comprise even more data, namely a 2-bit frame code, 2-bit pipe number, 4-bits of address data, up to 12-bits of data and 1 parity bit.

In the illustrated embodiments, data from the remote device 204 is automatically written into RAM 214 of the host device 202. More particularly, the data is automatically sent to particular locations within the ram according to the address associated with the data (e.g., the sensor and/or channel from which the data was derived). It will be appreciated that the host device 202 is aware of the remote device 202 (and the sensors coupled to the remote device and maybe even the operating conditions monitored by the sensors). As such, the host device "maps" certain locations in its RAM by giving these locations addresses that correspond to addresses associated with the data. In one embodiment, a certain location in memory may be given an address of A1, where tire pressure data has an address of A1 associated with it (e.g., a tire pressure sensor and/or channel is referenced as A1). As such, when the host device wants tire pressure data it merely has to access location A1 of its ram, rather than having to make a request for such data. It will be appreciated that software can be programmed to write to a particular address so that the data is delivered to the desired location. For example, the remote device 204 has 16 ADC channels and the DMA of the remote device may be programmed as a 16 half-word entry circular buffer that will continuously (after every ADC finished event) move the data (overwrite previous data at the same location). These locations in memory are different than the first and second remote windows 224, 226 that initially receive the data from the first and second pipes 230, 232, respectively. The results from the ADC are written to two separate locations internal to the ADC peripheral and are associated with two separate triggers. Each trigger in turn is programmed (associated) with independent DMA channels. The DMA channels are writing to the different transfer windows to separate the data. Additionally, this mapping of the host's RAM may be done at 102 of method 100, for example, when other aspects of the host device 202 are configured.

Finally, at 112 of method 100, the ADC 210 of the remote device 204 is configured (by the large transfer window 216 and pipe 0 218 of the host device 202) to automatically transfer continuous and injected data. Basically, since everything has now been configured, the data begins to be sent from the remote device 204 to the host device 202. The ADC can, for example, continuously send updated data from all 16 channels every 50 microseconds or so. The ADC generates a trigger (either time or event based) that is in turn programmed to individual DMA channels and written to the respective MLI transfer windows. There is no conflict between the DMA triggers because there is only one ADC. Thus, the remote device 204 continually receives signals from the sensors and digitizes those signals as they are received. The digitized data is then automatically routed into the proper locations in RAM of the host device 202. Since the data is continuously sent, a user can invalidate a channel number in the RAM data and check for a change to determine that the data is in fact "new or refreshed" since the last read.

The host device 202 reads data from its RAM 214 as needed, such as during a crash event, for example. This goes for both time based data which is continually updated, and event based data. It will be appreciated that since the host device 202 controls the acquisition of event based or injected data, the host device 202 will know when to look to its RAM 214 for such data since it will be aware of when a triggering event occurs. The host device 202 may also, however, read data from ram in a circular manner to continually adjust certain operating conditions of the vehicle, such as the interior temperature of the car and/or the drive train (e.g., to reduce fuel consumption). It will also be appreciated that since the host device 202 is merely reading data from its ram, the throughput is only using bus utilization. Additionally, once the host device 202 uses a certain piece of data, the host device 202 can write to its RAM 214 to mark that data so that the host device can identify that data as having been used or "old". In this manner, the host device 202 can tell when the data has been updated (e.g., by confirming that the data has not been altered or "flagged").

It will be appreciated that, aside from the MLI 208, the remote device 204 can be communicated with through a second serial port, namely SSC 240 which is a type of serial peripheral interface (SPI). The STCU 242 in the remote device 204 is a system control unit which is responsible for a clock that clocks data through and out of the remote device 204. The ports 244 in the remote device 204 serve to configure a bus when coming out of a reset. Among other things, the bus is used to read the ports 244 to determine whether the remote device 204 has been configured as described herein to automatically send data to the host device 202 and/or whether MLI or serial peripheral interface (SPI) is to be used for communications. The remote window 0 248 in the remote device 204 is used in conjunction with pipe 0 to configure the remote device 204. It will be appreciated that the SPI can only work as a slave device so it can not initiate transfers on it's own. The MLI and SPI are mutually exclusive since they share some of the same port pins so only one can be active at a time. The MLI can be configure by this disclosure to transfer the data autonomously as a master (host) device.

Figure 3:
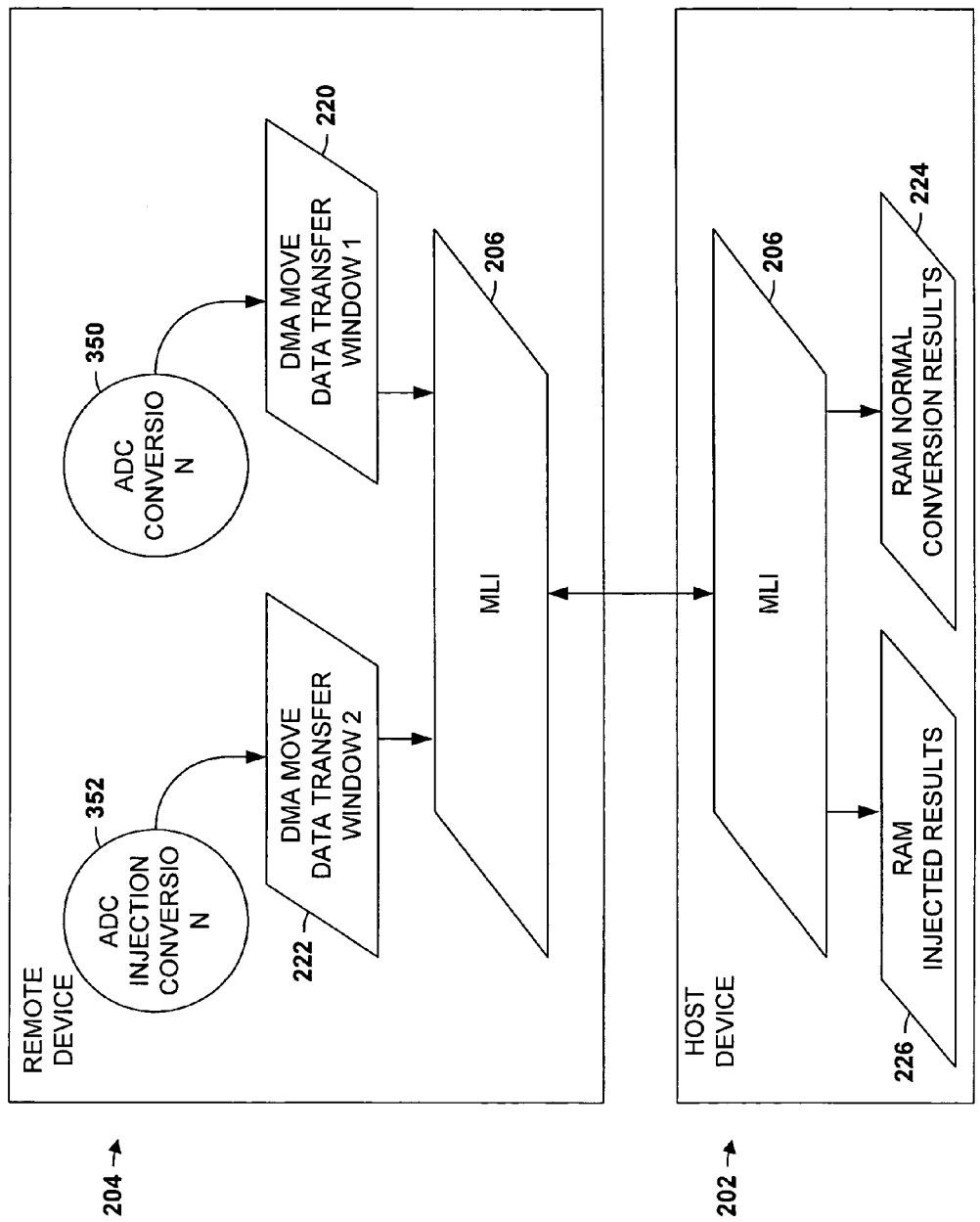
FIG. 3 is a block diagram illustrating data communications between a host device and a local or remote device according to one or more aspects and/or embodiments of the present invention.

Turning to FIG. 3, movement of data as described herein is diagrammatically illustrated. It will be appreciated that this is the movement that occurs after setup (e.g., where pipe 0 is no longer needed). Two events could occur on the remote device 204—a routine time based ADC conversion 350 or an event driven ADC injected conversion 352. The DMA is preconfigured for these moves so that whenever there is an ADC conversion, the DMA facilitates a move into the MLI 208 through the first and second small transfer windows 220, 222, respectively. The MLI of the remote device 204 then serializes this parallel data and transfers it to the MLI of the host device 202. The MLI of the host device 202 puts the data back into parallel form and places it into the appropriate location in ram depending on whether the data is injected 226 or normally converted 224, as well as based upon an address associated with the data and a corresponding address in mapped ram. The system is designed so that the baud rate of the MLI transfer is sufficiently higher than the data being sent. For example, if the ADC 210 can present a new result to the MLI every 3 microseconds and the MLI baud rate is 20 Mbit, then a transfer is 25-bits plus some handshaking of the MLI protocol. So, a transfer of one message consumes around 1.25 microseconds which is less than 50% of the total available bandwidth of the MLI bus.

Conventionally, when a host device or controller would need some type of data, such as the presence and/or weight of a passenger to determine whether to deploy an airbag during a crash condition, for example, the host device would need to make a request for the data, which would also generally include a request for an analog to digital conversion, such as on one or more signals from a weight sensor, for example. After the request is sent by the host device, it would be received and read by a remote device, which would subsequently obtain and digitize an appropriate signal and then send the digitized signal back to the host device. Since crashes occur in seconds or less, it can thus be appreciated that having fresh data readily available in ram of the host device as described herein is thus desirable. It will also be appreciated, however, that the value of such timely data is not limited to crash events. For example, the routine availability of such data may also be desirable to control steering, develop a power train strategy (e.g., fuel, air and spark), etc. With regard to a crash event, however, having the data already in ram have further value in that the communication path between a sensor and the remote device and/or between the remote device and the host device may be disrupted during the crash event, thus inhibiting the flow of data. In other situations, unintelligent request for data may waste bandwidth since the condition and/or situation being monitored may not have changed (e.g., passenger seat may remain empty throughout the duration of travel). In any event, the value of continually updated data that is readily available as provided herein can be appreciated.

It will be appreciated that in various embodiments clock and/or clocking circuitry is utilized in automatically sending data from the remote device 204 to the host device 202 as described herein (as well as during the configuration of the remote device 204 by the host device 202). It will also be appreciated that there are times when data is not being exchanged between the remote device 204 and the host device 202. Accordingly, having the clock "run" continuously, when no data transmissions are occurring, can be undesirable as resources may be wasted and interference may be increased. For example, current may be drawn, power may be consumed and electromagnetic interference (EMI) may be increased when the clock is allowed to continue to cycle in the absence of transmissions.

Figure 4:
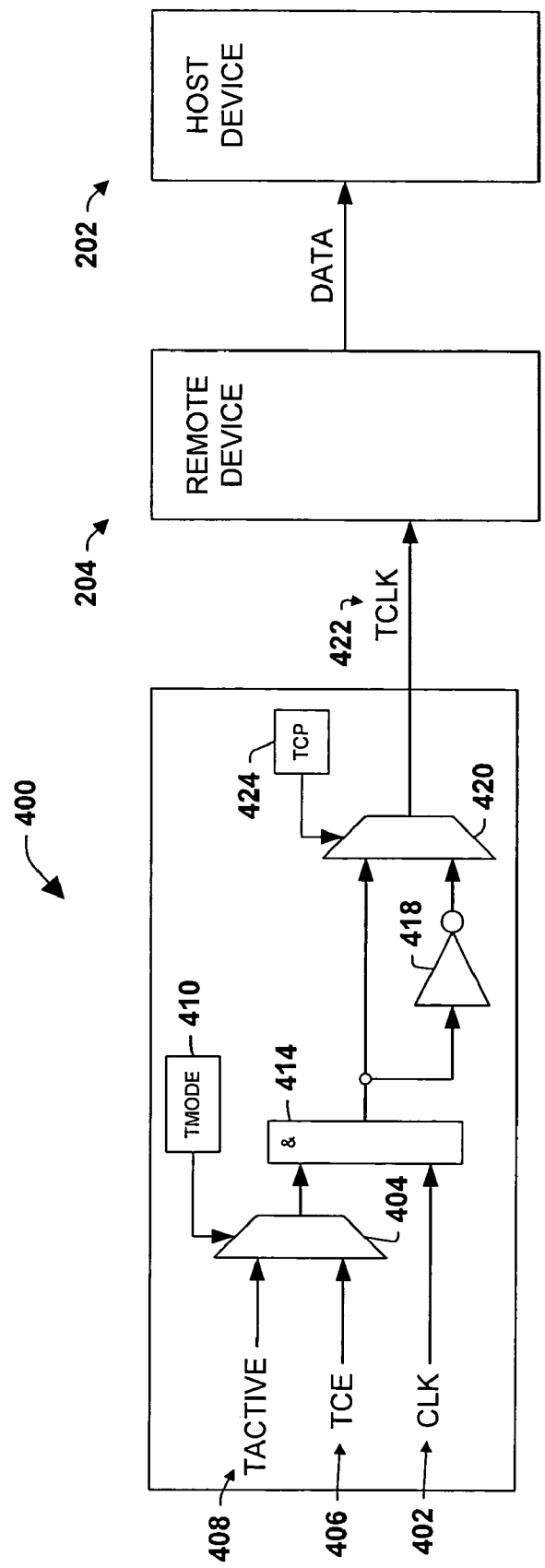
FIG. 4 is a schematic diagram illustrating an exemplary clocking circuit in a motor vehicle designed to control the application of a clock (CLK) signal utilized in automatically transferring data from an external or remote device in the motor vehicle to a host device or controller in the motor vehicle according to one or more aspects and/or embodiments of the present invention.

FIG. 4 therefore schematically illustrates an exemplary clocking circuit 400 that can control the application of a clock (CLK) signal 402 according to one or more aspects and/or embodiments of the present invention. In the illustrated embodiment, the clocking circuit 400 is implemented in the multilink interface and is designed to control the application of a clock (CLK) signal utilized in automatically transferring data from the external or remote device 204 to the host device or controller 202, and more particularly between the multilink of the remote device 204 and the multilink of the host device 202. The circuit 400 includes a first multiplexer 404 adapted to receive a transmit clock enable (TCE) signal 406 and a transmit active (TACTIVE) signal 408. The TCE signal 406 is operative to enable the CLK signal 402 to pass into the circuit 400, while the TACTIVE signal 408 is operative allow the CLK signal 402 to only selectively pass into the circuit 400 based upon the transmission of data. Accordingly, the TCE signal 406 would cause the clock to run continuously even when no data transmissions are occurring. This allows for backward compatibility of the circuit 400, which may be an important and/or desirable feature in some applications.

The circuit 400 also includes a transmission mode (TMODE) selection component 410 operatively coupled to the first multiplexer 404. The TMODE selection component 410 can be set to operate in an enable mode and in a selectively enable mode. When configured to operate in the enable mode, the TMODE selection component 410 causes the first multiplexer 404 to output the TCE signal 406, and when configured to operate in the selectively enable mode, the TMODE selection component 410 causes the first multiplexer 404 to output the TACTIVE signal 408. In one embodiment, the TMODE selection component 410 is generally implemented as an extra bit (e.g., that can be changed between a 0 and a 1) in a configuration register, such as a special function register (SFR), for example, that would be programmed by a user as part of normal software setup.

In the illustrated embodiment, the TCE signal 406 or TACTIVE signal 408 output by the first multiplexer 404 is fed into an AND component 414 in the circuit 400. The AND component 414 generally comprises a logic AND gate, and is thus operative to perform a logical AND operation on signals input thereto. The CLK signal 402 is similarly applied to the AND component 414. Accordingly, the CLK signal 402 is continually output from the AND component 414 when the TMODE selection component 410 causes the TCE signal 406 to be output by the first multiplexer 404 (e.g., providing backward compatibility in various embodiments). In contrast, the CLK signal 402 is only output from the AND component 414 when the TMODE selection component 410 causes the TACTIVE signal 408 to be output by the first multiplexer and the TACTIVE signal 408 is high (e.g., a logic 1).

The continually cycling or selectively cycling CLK signal 402 output from the AND component 414 is fed into an inverter component 418 as well as into a second multiplexer 420. The inverted signal output from the inverter component 418 is similarly fed into the second multiplexer 420. The second multiplexer 420 is operative to output a transmission clock (TCLK) signal 422 that causes data to be transmitted from the external or remote device 204 in the motor vehicle to the host device or controller 202 in the motor vehicle as described herein. It will be appreciated, however, that while the circuit is described herein in the illustrated embodiment as facilitating data transmissions between the remote 204 and host 202 devices, the transmissions may be more aptly described in various embodiments as occurring within the context of the MLI, and a motor vehicle may merely be one exemplary application.

Finally, in the illustrated embodiment, a transmission control protocol (TCP) component 424 is included in the circuit 400. The TCP component 424 is operatively coupled to the second multiplexer 420 and is configured to operate in a non-inverted mode and in an inverted mode. When operated in the non-inverted mode, the TCP component 424 causes the second multiplexer 420 to output the non-inverted signal output from the AND component 414 as the TCLK signal 422, and when operated in the inverted mode, the TCP component 424 causes the second multiplexer 420 to output the inverted signal output from the inverter component 418 as the TCLK signal 422. It will be appreciated that this allows a user to choose whether the clock idles high or low.

Figure 5:
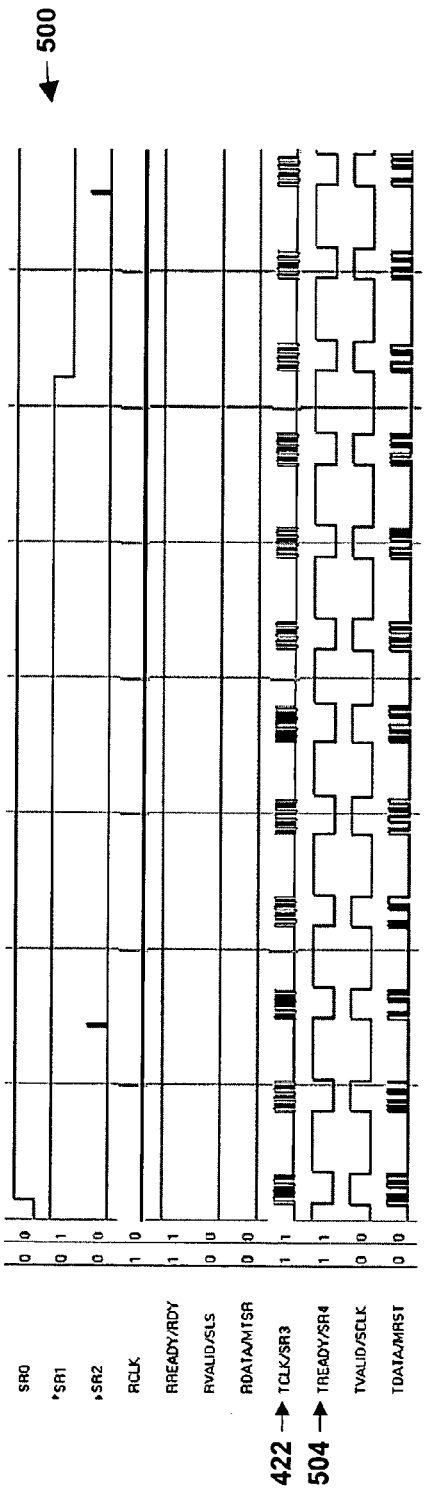
FIG. 5 is a diagram illustrating a clock signal that is controlled to cycle when data transmissions are occurring according to one or more aspects and/or embodiments of the present invention.
Figure 6:
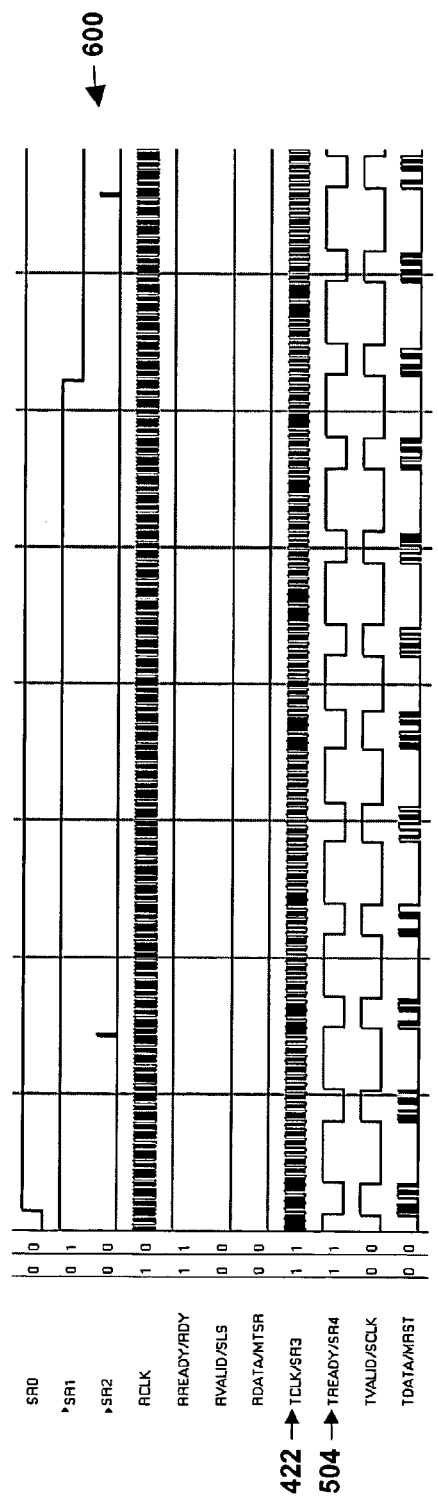
FIG. 6 is a diagram illustrating a clock signal that is allowed to cycle regardless of the occurrence or non-occurrence of data transmissions according to one or more aspects and/or embodiments of the present invention.

Accordingly, controlling a clock signal according the embodiments described herein allows the clock signal to be deactivated when no data is being transmitted to conserve resources and mitigate EMI interference or allows the clock to cycle continually. FIGS. 5 and 6 are graphs 500 and 600 illustrating the different types of clock activity. For example, FIG. 5 illustrates one embodiment of where the clock is only on when needed to facilitate data transmissions, while FIG. 6 illustrates one embodiment where the clock is allowed to cycle continually regardless of the status of data transmissions. In FIG. 5 the TCLK signal 422 is high (indicating that the clock is on or active) when TREADY 504 is low, where data transmissions only occur when TREADY 504 is low. In contrast, the TCLK signal 422 remains high in FIG. 6 (indicating that the clock continues to cycle regardless of the status of TREADY 504 and whether data transmissions are occurring).

Although the invention has been shown and described with respect to one or more implementations, equivalent alterations and modifications will occur to others skilled in the art based upon a reading and understanding of this specification and the annexed drawings. The invention includes all such modifications and alterations. With regard to the various functions performed by the above described components (e.g., assemblies, devices, circuits, ASICS, software programs, programs in execution, programs on a transferable medium, such as a disk, threads, etc.), the terms (including reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" as utilized herein merely means an example, rather than the best. Further, the pipes referenced herein can be referenced with any (and even the same) numbers. The 0, 1 and 2 references used herein are merely used for convenience and ease of understanding.

What is claimed is:

1. A clocking circuit in a motor vehicle designed to control an application of a clock (CLK) signal utilized in automatically transferring data from an external or remote device in the motor vehicle to a host device or controller in the motor vehicle, comprising:

a first multiplexer configured to receive a transmit clock enable (TCE) signal and a transmit active (TACTIVE) signal, where the TCE signal enables the CLK signal to pass into the circuit, and where the TACTIVE signal allows the CLK signal to selectively pass into the circuit based upon the transmission of data;

a transmission mode (TMODE) selection component operatively coupled to the first multiplexer, and configured to operate in an enable mode and in a selectively enable mode, where the enable mode causes the first multiplexer to output the TCE signal and where the selectively enable mode causes the first multiplexer to output the TACTIVE signal;

an AND logic component configured to receive the output from the first multiplexer and the CLK signal;

an inverter component operatively coupled to the AND component and operative to invert the output from the AND component;

a second multiplexer operatively coupled to the AND component and the inverter, the second multiplexer configured to receive the output from the AND component and the output from the inverter at separate inputs thereof, and operative to output a transmission clock (TCLK) signal that causes data to be transmitted from the external or remote device in the motor vehicle to the host device or controller in the motor vehicle; and a transmission control protocol (TCP) component operatively coupled to the second multiplexer; and configured to operate in a non-inverted mode and in an inverted mode, where the non-inverted mode causes the second multiplexer to output the non-inverted signal output from the AND component as the TCLK signal and where the inverted mode causes the second multiplexer to output the inverted signal output from the inverter as the TCLK signal.

2. The circuit of claim 1, where the TMODE selection component is implemented as an extra bit in a configuration register.

3. The circuit of claim 2, where the TMODE selection component can be programmed by a user as part of normal software setup.

4. The circuit of claim 3, where the TMODE selection component can be programmed to be a logic 0 or a logic 1.

5. The circuit of claim 4, where the TMODE selection component comprises a special function register (SER).

6. The circuit of claim 1, where the AND component comprises a logic AND gate operative to perform a logical AND operation on signals input thereto.

7. The circuit of claim 2, wherein the AND component comprises a logic AND gate operative to perform a logical AND operation on signals input thereto.

8. The circuit of claim 1, where the clock idles high or low depending on whether the TCLK signal corresponds to the non-inverted signal output from the AND component or the inverted signal output from the inverter.

9. The circuit of claim 2, where the clock idles high or low depending on whether the TCLK signal corresponds to the non-inverted signal output from the AND component or the inverted signal output from the inverter.

10. The circuit of claim 6, where the clock idles high or low depending on whether the TCLK signal corresponds to the non-inverted signal output from the AND component or the inverted signal output from the inverter.

11. The circuit of claim 7, where the clock idles high or low depending on whether the TCLK signal corresponds to the non-inverted signal output from the AND component or the inverted signal output from the inverter.

12. A method of controlling an application of a clock (CLK) signal utilized in automatically transferring data from an external or remote device in a motor vehicle to a host device or controller in the motor vehicle, comprising:

designating whether a clock enable (TCE) signal or a transmit active (TACTIVE) signal is output from a first multiplexer, where the TCE signal enables the CLK signal to pass into a clocking circuit operatively coupled to the remote device and the host device, and where the TACTIVE signal allows the CLK signal to selectively pass into the circuit based upon the transmission of data;

applying the TCE signal or the TACTIVE signal output from the first multiplexer to an AND component;

applying the CLK signal to the AND component;

applying the output from the AND component to a first input of a second multiplexer and to an inverter, where the AND component outputs a continuous CLK signal or a selective CLK signal depending upon the output from the first multiplexer;

applying the output from the inverter to a second, different input of the second multiplexer; and designating whether a TCLK signal output from the second multiplexer corresponds to the non-inverted signal output from the AND component or to the inverted signal output from the inverter.

13. The method of claim 12, where the AND component outputs the continuous CLK signal when the first multiplexer outputs the TCE signal, and where the AND component outputs the selective CLK signal when the first multiplexer outputs the TACTIVE signal.

14. The method of claim 12, where designating whether the clock enable (TCE) signal or the TACTIVE signal is output from the first multiplexer comprises:

operating a transmission mode (TMODE) selection component operatively coupled to the first multiplexer in an enable or a selectively enable mode, where operating the TMODE selection component in the enable mode causes the first multiplexer to output the TCE signal and where operating the TMODE selection component in the selectively enable mode causes the first multiplexer to output the TACTIVE signal.

15. The method of claim 13, where designating whether the clock enable (TCE) signal or the TACTIVE signal is output from the first multiplexer comprises:

operating a transmission mode (TMODE) selection component operatively coupled to the first multiplexer in an enable or a selectively enable mode, where operating the TMODE selection component in the enable mode causes the first multiplexer to output the TCE signal and where operating the TMODE selection component in the selectively enable mode causes the first multiplexer to output the TAOTIVE signal.

16. The method of claim 12, where designating whether the TCLK signal corresponds to the non-inverted signal output from the AND component or to the inverted signal output from the inverter comprises:

operating a transmission control protocol (TCP) component operatively coupled to the second multiplexer in a non-inverted or in an inverted mode, where operating the TCP component in the non-inverted mode causes the second multiplexer to output the non-inverted signal output from the AND component as the TCLK signal and where operating the TCP component in the inverted mode causes the second multiplexer to output the inverted signal output from the inverter as the TCLK signal.

17. The method of claim 13, where designating whether the TCLK signal corresponds to the non-inverted signal output from the AND component or to the inverted signal output from the inverter comprises:

operating a transmission control protocol (TCP) component operatively coupled to the second multiplexer in a non-inverted or in an inverted mode, where operating the TCP component in the non-inverted mode causes the second multiplexer to output the non-inverted signal output from the AND component as the TCLK signal and where operating the TCP component in the inverted mode causes the second multiplexer to output the inverted signal output from the inverter as the TCLK signal.

18. The method of claim 14, where designating whether the TCLK signal corresponds to the non-inverted signal output from the AND component or to the inverted signal output from the inverter comprises:

operating a transmission control protocol (TCP) component operatively coupled to the second multiplexer in a non-inverted or in an inverted mode, where operating the TCP component in the non-inverted mode causes the second multiplexer to output the non-inverted signal output from the AND component as the TCLK signal and where operating the TCP component in the inverted mode causes the second multiplexer to output the inverted signal output from the inverter as the TCLK signal.

19. The method of claim 15, where designating whether the TCLK signal corresponds to the non-inverted signal output from the AND component or to the inverted signal output from the inverter comprises:

operating a transmission control protocol (TCP) component operatively coupled to the second multiplexer in a non-inverted or in an inverted mode, where operating the TCP component in the non-inverted mode causes the second multiplexer to output the non-inverted signal output from the AND component as the TCLK signal and where operating the TCP component in the inverted mode causes the second multiplexer to output the inverted signal output from the inverter as the TCLK signal.

20. A clocking circuit designed to control an application of a clock (CLK) signal utilized in automatically transferring data from an aspect of a multilink interface (MLI) in an external or remote device to an aspect of the MLI in a host device or controller, comprising:

a first multiplexer configured to receive a transmit clock enable (TCE) signal and a transmit active (TACTIVE) signal, where the TCE signal enables the CLK signal to pass into the circuit, and where the TACTIVE signal allows the CLK signal to selectively pass into the circuit based upon the transmission of data;

a transmission mode (TMODE) selection component operatively coupled to the first multiplexer, and configured to operate in an enable mode and in a selectively enable mode, where the enable mode causes the first multiplexer to output the TCE signal and where the selectively enable mode causes the first multiplexer to output the TAOTIVE signal;

an AND logic component configured to receive the output from the first multiplexer and the CLK signal;

an inverter component operatively coupled to the AND component and operative to invert the output from the AND component;

a second multiplexer operatively coupled to the AND component and the inverter, the second multiplexer configured to receive the output from the AND component and the output from the inverter at separate inputs thereof, and operative to output a transmission clock (TCLK) signal that causes data to be transmitted from the external or remote device in the motor vehicle to the host device or controller in the motor vehicle; and a transmission control protocol (TCP) component operatively coupled to the second multiplexer; and configured to operate in a non-inverted mode and in an inverted mode, where the non-inverted mode causes the second multiplexer to output the non-inverted signal output from the AND component as the TCLK signal and where the inverted mode causes the second multiplexer to output the inverted signal output from the inverter as the TCLK signal.

* * * * *

UNITED STATES PATENT AND TRADEMARK OFFICE
CERTIFICATE OF CORRECTION

PATENT NO. : 7,464,202 B2 Page 1 of 1
APPLICATION NO. : 11/364059
DATED : December 9, 2008
INVENTOR(S) : Chris Wunderlich It is certified that error appears in the above-identified patent and that said Letters Patent is hereby corrected as shown below:

Column 10, claim 5, line 41: please replace "(SER)" to be --(SFR)--
Column 10, claim 15, line 48: please replace "TAOTIVE" to be --TACTIVE--
Column 12, claim 20, line 56: please replace "TAOTIVE" to be --TACTIVE--

Signed and Sealed this

Third Day of February, 2009

JOHN DOLL
*Acting Director of the United States Patent and Trademark Office*